(12) United States Patent
Xiong

(10) Patent No.: US 9,913,335 B1
(45) Date of Patent: Mar. 6, 2018

(54) LED DRIVER CIRCUIT WITH THREE LEVEL STEP DIMMING INTERFACE

(71) Applicant: Universal Lighting Technologies, Inc., Madison, AL (US)

(72) Inventor: Wei Xiong, Madison, AL (US)

(73) Assignee: UNIVERSAL LIGHTING TECHNOLOGIES, INC., Madison, AL (US)

( * ) Notice: Subject to any disclaimer, the term of this patent is extended or adjusted under 35 U.S.C. 154(b) by 0 days.

(21) Appl. No.: 15/422,678

(22) Filed: Feb. 2, 2017

Related U.S. Application Data

(60) Provisional application No. 62/290,213, filed on Feb. 2, 2016.

(51) Int. Cl.
*H05B 33/08* (2006.01)

(52) U.S. Cl.
CPC ..... *H05B 33/0845* (2013.01); *H05B 33/0809* (2013.01); *H05B 33/089* (2013.01)

(58) Field of Classification Search
CPC .......................... H05B 33/0845; H05B 33/089
USPC ....................................................... 315/247
See application file for complete search history.

(56) References Cited

U.S. PATENT DOCUMENTS

| | | | | |
|---|---|---|---|---|
| 7,843,141 B1* | 11/2010 | Xiong | ................... | H05B 41/42 315/224 |
| 2014/0152187 A1* | 6/2014 | Lin | .................... | H05B 33/0815 315/200 R |
| 2015/0042227 A1* | 2/2015 | Kumar | ............... | H05B 33/0815 315/85 |

* cited by examiner

*Primary Examiner* — Dylan White
(74) *Attorney, Agent, or Firm* — Patterson Intellectual Property Law, P.C.; Mark J. Patterson; Grant M. Ford

(57) ABSTRACT

An LED driver circuit provides a direct input line sensing step dimming interface for controlling an LED load. The LED driver circuit includes an input voltage source, a first input line, a second input line, and a neutral line. A diode bridge is coupled to the neutral line and to each of the first line switch and to the second line switch at a side of each opposite to the input voltage source. The LED driver circuit includes a first isolation circuit and a second isolation circuit and a microcontroller having a first sense input and a second sense input. The microcontroller receives at least one of the first sense input and the second sense input from the first and second isolation circuits. The microcontroller controls LED driver circuit output to a load according to the received sense input.

12 Claims, 10 Drawing Sheets

LED DRIVER CIRCUIT WITH THREE LEVEL STEP DIMMING INTERFACE

CROSS-REFERENCES TO RELATED APPLICATIONS

This application claims benefit of U.S. Provisional Patent Application No. 62/290,213, filed Feb. 2, 2016, entitled "Led Driver Circuit with Three Level Step Dimming Interface," which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to multi-step dimming driver circuits for a light emitting diode (LED). More particularly, the present invention relates to providing a multi-step dimming LED driver which is insensitive to a particular load (e.g., an extremely light load).

A step dimming driver or ballast circuit as described in U.S. Pat. No. 7,843,141 is illustrated in FIG. 1. The step dimming driver of FIG. 1 has three power line inputs: two hot (black) and one neutral line. By sensing either how many or which hot line is connected to the driver, the driver can be controlled to dim a lighting output to a certain percentage of the full lighting output. For example, if only line #1 is connected (i.e., only switch S_1 is closed), the lighting output may be dimmed to 30%. If only line #2 is connected (i.e., only switch S_2 is closed), the lighting output may be dimmed to 70%. If both of line #1 and #2 are connected (i.e., both of switches S_1 switch S_2 are closed) the lighting output may be set to 100% output.

To achieve proper step dimming function, the line input or line connection must be reliably sensed at all kinds of load conditions (e.g., heavy load, light load, etc.). Conventional indirect line sensing methods such as those implemented by the circuit of FIG. 1 are very sensitive to the load condition.

As shown in FIG. 1, there are two voltage sensing branches: (1) resistors R3, R4 and R5 to sense the voltage across diode D6; and (2) resistors R6, R7 and R5 to sense the voltage across diode D8. The voltage at Vc (V_dim) is the superposed voltage from Va and Vb, as shown in FIGS. 2 and 3. When the connected load is large, the input rectifier will work continuously (or each diode in the rectifier bridge will conduct for a full half line cycle) so that the voltage across diodes D6 and D8 will form a half-wave sinusoidal shape. The voltage V_dim (Vc) may be either a continuous rectified full-wave (as illustrated in FIG. 2), or a half-rectified sinusoid waveform (as illustrated in FIG. 3). A dimming control signal used by the dimming control system of FIG. 1 may be determined by comparing an average voltage of Vc against a reference voltage.

When a connected load is very light (e.g., when an LED driver is operating in a lowest dimming mode), the line sensing method shown in FIG. 1 will not function properly. This is because when the load is very light, the diodes of the input rectifier bridge might not conduct full half-cycle.

What is needed, then, is an LED driver circuit that provides multi-step dimming that is relatively insensitive to load variations.

BRIEF SUMMARY OF THE INVENTION

LED driver circuit designs as disclosed herein are provided to provide direct line sensing step dimming interfaces for LED drivers and are provided to implement a load-insensitive line sensing dimming interface circuit.

One exemplary embodiment of the present invention includes an LED driver circuit configured to provide a direct input line sensing step dimming interface for controlling an LED load. The LED driver circuit includes an input voltage source coupled to a first input line having a first line switch and to a second input line coupled to a second line switch. The input voltage source is further coupled to a neutral line. The LED driver circuit also includes a diode bridge coupled to each of the first and second line switches at a side of each opposite to the input voltage source. The diode bridge is further coupled to the neutral line.

The LED driver circuit further includes a first isolation circuit coupled between the first line switch and the diode bridge, a second isolation circuit coupled between the second line switch and the diode bridge, and a microcontroller having a first sense input and a second sense input. The microcontroller receives at least one of the first sense input from the first isolation circuit and the second sense input from the second isolation circuit. The microcontroller controls an output of the LED driver circuit to a load at least in part based on the at least one of the first sense input and the second sense input.

Another exemplary embodiment of the present invention includes a method providing a direct input line sensing step dimming interface for a light emitting diode (LED) driver for controlling output to an LED load. The method includes first receiving an input voltage from a voltage source across a plurality of input lines of the LED driver. At least one input line providing the input voltage to the LED driver is sensed. An LED driver output is determined based at least in part upon the sensed at least one input line. A reference current associated with the LED driver output is provided to a converter. A load current corresponding to the reference value is output from the converter.

In a further exemplary embodiment of the present invention, a lighting fixture includes a housing, at least one light emitting diode (LED) coupled to the housing, and an LED driver configured to provide a direct input line sensing step dimming interface for controlling output to the at least one LED. The LED driver includes an input voltage source, a first input line having a first line switch coupled to the input voltage source, a second input line having a second line switch coupled to the input voltage source, and a neutral line coupled to the input voltage source. The LED driver includes a diode bridge coupled to each of the first line switch and to the second line switch at a side of each of the first line switch and the second line switch opposite to the input voltage source. The diode bridge is further coupled to the neutral line.

The LED driver circuit further includes a first isolation circuit coupled between the first line switch and the diode bridge, a second isolation circuit coupled between the second line switch and the diode bridge, and a microcontroller having a first sense input and a second sense input. The microcontroller receives at least one of the first sense input from the first isolation circuit and the second sense input from the second isolation circuit. The microcontroller controls an output of the LED driver circuit at least in part based on the at least one of the first sense input and the second sense input.

Numerous other objects, features, and advantages of the present invention will be readily apparent to those skilled in the art upon a reading of the following disclosure when taken in conjunction with the accompanying drawings.

DETAILED DESCRIPTION OF THE INVENTION

Figure 1:
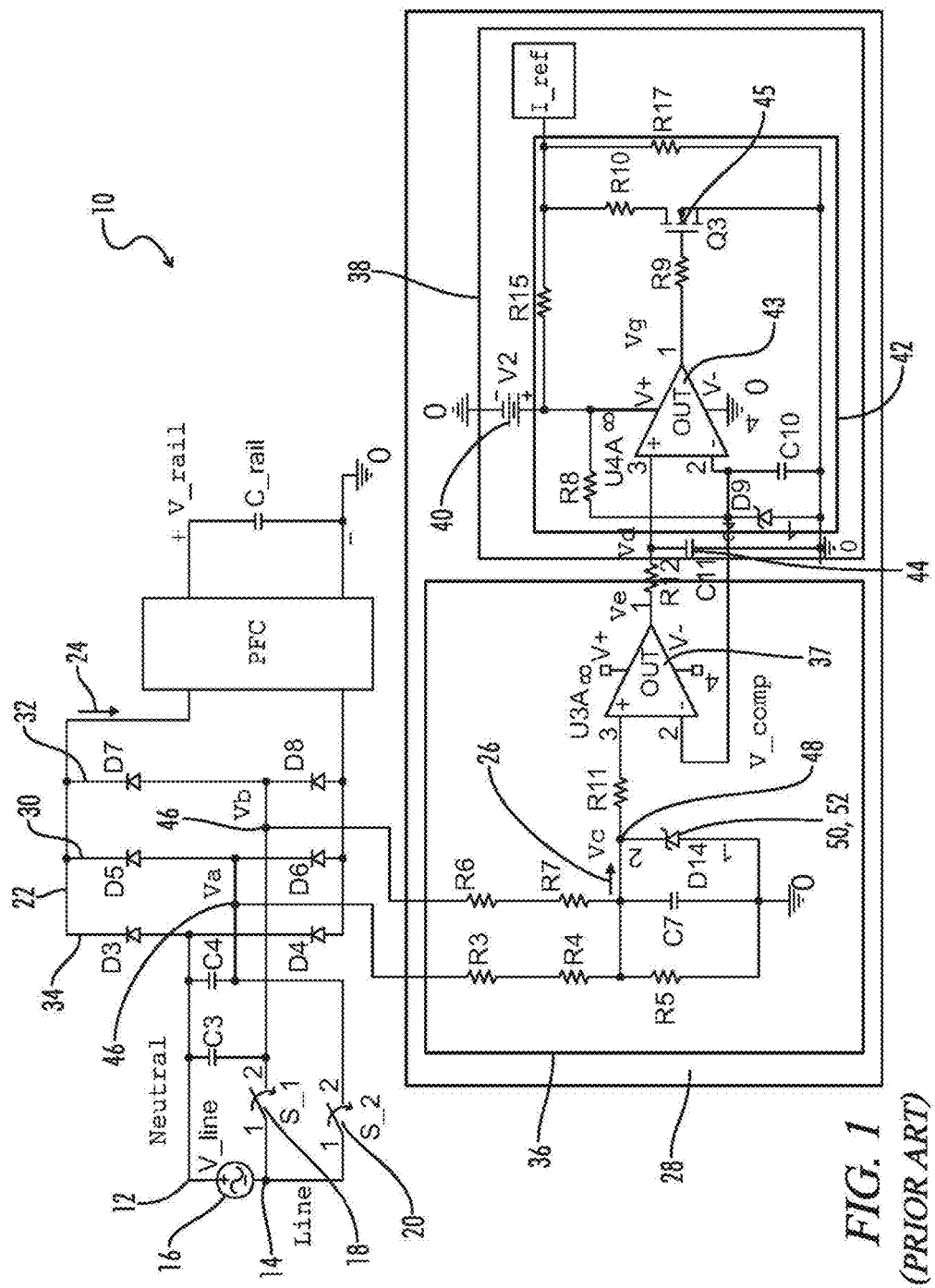
FIG. 1 illustrates a step dimming driver circuit as known in the art.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Referring generally to FIGS. 1-9, an exemplary LED driver circuit having a three level step dimming interface and associated methods are now illustrated in greater detail. Where the various figures may describe embodiments sharing various common elements and features with other embodiments, similar elements and features are given the same reference numerals and redundant description thereof may be omitted below.

As described above, FIG. 1 illustrates a step dimming driver as described in U.S. Pat. No. 7,843,141. In FIG. 1, power input terminals 12 and 14 connect an AC source 16 to the dimming interface 10. The periodic AC signal from the AC power source 16 is converted into a DC power signal, V_rail, to power a ballast inverter circuit attached to the gas discharge lamp. To convert the periodic AC signal into the DC power signal, V_rail, a rectifier circuit 22 generates a rectified power output signal 24 from the periodic AC signal. The rectified power output signal 24 may then be transmitted through a power factor correction (PFC) circuit, and then finally through an integrator, C_rail, to produce a DC power signal, V_rail, that powers the ballast inverter circuit.

The ballast inverter circuit of FIG. 1 provides power to the gas discharge lamp at either a dimming power level or at a normal power level. To determine this power level, first and second dimming switches 18, 20 are connected between one of the power input terminals 12, 14 and the rectifier circuit 22. The state of switches 18, 20 will determine whether the gas discharge lamp operates at the dimming power level or at the normal power level. In other words, the operation of switches 18, 20 determines the characteristics of a dimming interface signal 26 that is output from the rectifier circuit 22 to a dimming control signal generator circuit 28.

Figure 2:
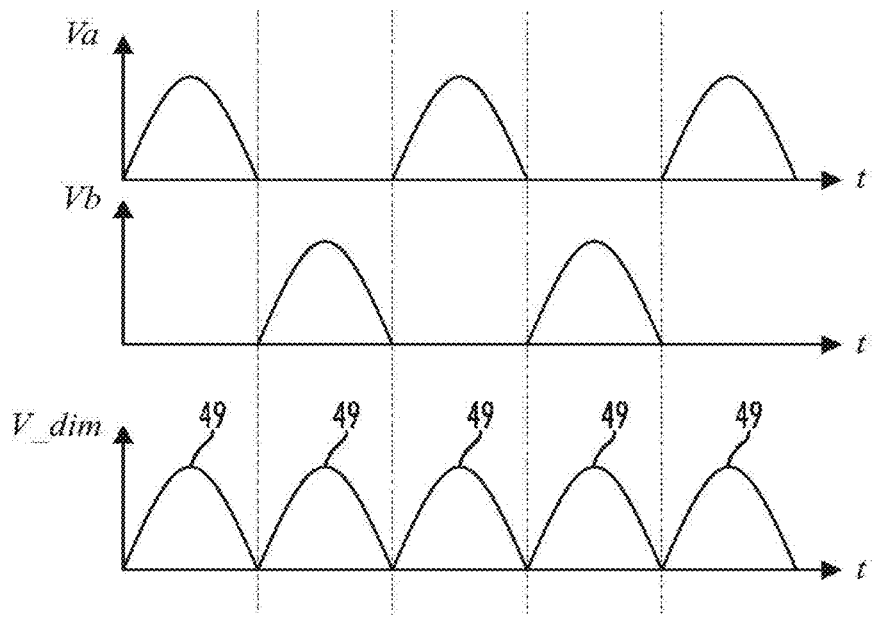
FIG. 2 illustrates a timing diagram for the driver of FIG. 1 where a V_dim voltage is a continuous rectified full-wave signal according to an exemplary embodiment.
Figure 3:
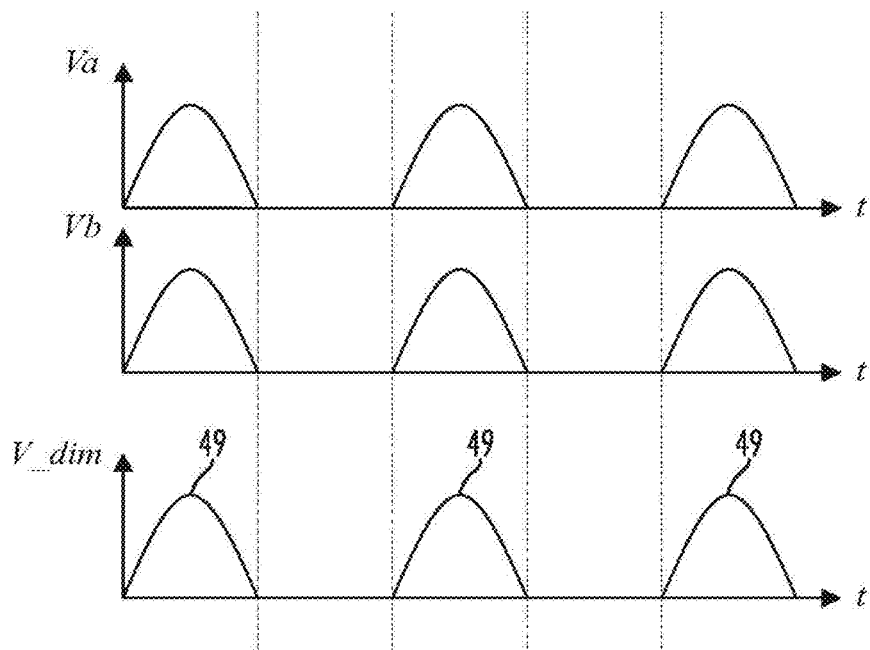
FIG. 3 illustrates a timing diagram for the driver of FIG. 1 where a V_dim voltage is a half-rectified sinusoid waveform according to an exemplary embodiment.

In the circuit shown in FIG. 1, the rectifier circuit 22 is responsive to the manipulation of the first and second dimming switches 18, 20 to cause the dimming interface signal 26 to be a half-wave rectified signal when each of the dimming switches 18, 22 are closed and to be a full wave rectified signal when one of the dimming switches 18, 20 is open and the other dimming switch 20, 18 is closed. In FIGS. 2-3, the dimming interface signal 24 is the combination of signals $V_a$ and $V_b$ and is shown as V_dim.

The embodiment shown in FIG. 1 illustrates one arrangement for the rectifier circuit 22 and the dimming switches 18, 20. In this embodiment, the rectifier circuit 22 has a first rectifier leg 30, a second rectifier leg 32, and a third rectifier leg 34. Through this arrangement, each rectifier leg 32 is a half-bridge rectifier leg that rectifies either the positive or the negative half-cycle of the periodic AC signal from the power input terminals 12, 14. Which leg 30, 32 rectifies a particular half-cycle of the AC periodic signal depends on the switching state of the dimming switches 18, 20. As shown in FIG. 1, the first dimming switch 18 is connected between the negative power input terminal 14 and the second rectifier leg 32. Similarly, the second dimming switch 20 is connected between the same power input terminal 14 and the first rectifier leg 30.

When the first dimming switch 18 is closed and the second dimming switch 20 is open, the first and second rectifier legs 30, 32 rectify the opposite half-cycle of the periodic AC signal. Closing the first dimming switch 18 and opening the second dimming switch 20 causes the first rectifier leg 30 to be connected to the positive power input terminal 12 while the second rectifier leg 32 is connected to the negative input terminal 14. In this case, the positive half-cycle is transmitted through the positive power input terminal 12 and into the first rectifier leg 30. As shown in FIG. 2, the first leg 30 rectifies the positive half-cycle of the periodic AC signal to form the half-wave rectified signal $V_a$. Conversely, the negative half-cycle of the periodic AC signal is rectified by the second rectifier leg 32. Thus, the negative half-cycle is transmitted through the second rectifier leg 32 to produce the output shown in FIG. 2 as $V_b$. Accordingly, $V_a$ and $V_b$ are each half-wave rectified signals phase shifted approximately pi/2 radians from one another. The combination of these signals is a full-wave rectified signal that forms the dimming interface signal V_dim.

The first and second rectifier legs 30, 32 also rectify the opposite half-cycles when the first dimming switch 18 is open and the second dimming switch 20 is closed except that the half-cycles rectified by each leg are reversed. In this case, closing the second dimming switch 20 and opening the first dimming switch 18 causes the second rectifier leg 32 to be connected to the positive power input terminal 12 while the first rectifier leg 30 is connected to the negative input terminal 14. Accordingly, the positive half-cycle is transmitted through the positive power input terminal 12 and into the second rectifier leg 32. As similarly shown in FIG. 2, the second leg 32 may rectify the positive half-cycle of the periodic AC signal to form the half-wave rectified signal $V_b$. Conversely, the negative half-cycle of the periodic AC signal is rectified by the first rectifier leg 30. Thus, the negative half-cycle is transmitted through the first rectifier leg 30 to produce the output shown in FIG. 2 as $V_a$. In this scenario, $V_a$ and $V_b$ are again each half-wave rectified signals phase shifted approximately pi/2 radians. The combination of these signals is a full-wave rectified signal that results in the dimming interface signal V_dim.

Finally, the first and second rectifier legs 30, 32 both rectify the same half-cycle of the AC periodic signal when both of the dimming switches 18, 20 are closed. As shown in FIG. 1, both rectifier legs 30, 32 are connected to the negative input terminal 14. In this embodiment, both rectifier legs 30, 32 rectify the negative half-cycle of the periodic signal. This is shown as $V_a$, $V_b$ in FIG. 3. The positive half-cycle is rectified by a third leg 34. The dimming interface signal is the combination of $V_a$ and $V_b$ which is the half-wave rectified signal shown as V_dim.

Referring again to FIGS. 1-3, the rectifier circuit 22 has dimming interface output terminals 46 that couple the dimming interface signal V_dim to a dimming control signal generator circuit 28. One of the terminals 46 is connected to the first rectifier leg 30 while another one of the terminals 46 is connected to the second rectifier leg 30. The dimming control signal generator circuit 28 is responsive to the dimming interface signal V_dim to generate a DC control signal, I_ref, for controlling the ballast inverter circuit.

In one embodiment, the dimming control signal generator circuit 28 has a pulse generating circuit 36 and a reference signal production circuit 38. Between the dimming interface output terminals 46 and an input terminal 48 to the pulse generating circuit 36, the pulse generating circuit 36 may have a voltage protection device 50 connected to a ground terminal. To reduce stresses on the circuit components of the pulse generating circuit 36, the voltage protection device 50 assures that the voltage into the input terminal 48 is maintained approximately at or below a protection voltage V_pro. Consequently, the voltage protection device 50 transforms the dimming interface signal V_dim into a semi-trapezoidal waveform as the voltage at the input terminal 48 of the pulse generating circuit 36.

The pulse generating circuit 36 is operable to generate pulses at a first pulse frequency when one of the dimming switches 18, 20 is open and the other dimming switch 20, 18 is closed. As shown in FIG. 2, the dimming interface signal, V_dim, in this scenario is a full-wave rectified signal. In one embodiment, the pulse generating circuit 36 has a comparison circuit 37 that receives the voltage $V_c$ at the input terminal 48 and compares the input signal 48 to a comparison value V_comp. The comparison circuit 37 transmits one of the pulses so long as the input signal 48 is approximately at or above the comparison value V_comp.

The voltage into the input terminal 48 will be greater than the comparison value, V_comp, when a crest is present in the dimming interface signal. Consequently, the pulse generating circuit 36 generates the pulses $V_e$ at a second pulse frequency that is half of the first pulse frequency when both dimming switches 18, 20 are closed.

Referring again to FIGS. 1-3, the pulses $V_e$ are then coupled to a reference signal production circuit 38 that generates a DC control signal, I_ref, having a first control signal value when the pulses $V_e$ are at the first pulse frequency and a second control signal value when the pulses $V_e$ are at the second pulse frequency. Consequently, the reference signal production circuit 38 operates to produce a DC control signal I_ref having a first control signal value when the dimming interface signal V_dim is a full-wave rectified signal, as shown in FIG. 2, and having a second control signal value when the dimming interface signal is a half-wave rectified signal, as shown in FIG. 3. When the dimming interface signal V_dim is a full-wave rectified signal, the first control signal value of the DC control signal I_ref is low thereby communicating to the electronic ballast that the lamp should be operated at a dimming power level. In contrast, the second control signal value of the DC control signal I_ref is high when the dimming interface signal V_dim is half-wave rectified signal thereby communicating to the electronic ballast that the lamp should be operated at a normal power level. Thus, the manipulation of the dimming switches 18, 20 determines the power level of the lamp.

Referring again to FIGS. 1-3, the reference signal production circuit 38 has a DC source 40 for generating the DC control signal, I_ref, and a reference level determination circuit 42 that receives the pulses $V_e$ to determine the level of the DC control signal, I_ref. A comparison circuit 43 may be connected to a network switch 45 and to a network of resistors (R10, R15, R17). Some of the resistors (R15, R17) have a permanent connection to the DC source 40 while at least one of the other resistors (R10) is connected to the DC source by the closing of the network switch 45.

To determine whether network switch 45 is closed (turned on) or opened (turned off), the reference signal production circuit 38 has an integration component 44 coupled to an output of the pulse generating circuit 36. In one embodiment, the integration component 44 is responsive to the pulses $V_e$ to generate a DC level determination signal $V_d$ having a high DC level determination signal value when the pulses $V_e$ are transmitted at the higher pulse frequency, and a low DC level determination signal value $V_d$ when the pulses $V_e$ are transmitted at the lower pulse frequency. Thus, the DC level determination signal $V_d$ has a higher value when one dimming switch 18, 20 is open and the other switch is closed, 20, 18.

The DC level determination signal $V_d$ is transmitted to a comparison circuit 43 connected between the integration component 44 and the network switch 45. The output of the comparison circuit drives the gate voltage $V_g$ of the network switch 45 thereby closing or opening the switch 45. The comparison circuit 43 compares the DC level determination signal $V_d$ with the comparison value V_comp to drive the gate voltage $V_g$ high when the DC level determination signal $V_d$ is high and to drive the gate voltage $V_g$ low when the DC level determination signal $V_d$ is low. Thus, the gate voltage $V_g$ is high and the network switch 45 is closed (on) when one of the dimming switches 18, 20 is closed and the other dimming switch 20, 18 is open. Conversely, the gate voltage $V_g$ is low and the network switch 45 is open (off) when the dimming switches 18, 20 are both closed.

By performing standard node analysis, one can determine the DC control signal, I_ref, transmitted to the electronic ballast. In this embodiment, the DC control signal, I_ref, is a reference current. When both of the dimming switches 18, 20 are closed, the network switch 45 is open and the DC source is not connected to the resistor (R10). Thus, the output of the dimming control signal generator circuit 28 can be expressed as: I_ref=$V_{dc\text{-}source}$*R17/(R15+R17) which causes the electronic ballast to operate the gas discharge lamp at a normal power level. Conversely, when one of the dimming switches 18, 20 is off and the other dimming switch 20, 18 is open, the output of the dimming control signal generator 28 can be expressed as I_ref=$V_{dc\text{-}source}$*R17/[R15+(R17//R10)] which is lower than the above-mentioned DC control signal value. Consequently, the gas-discharge lamp operates at a dimming power level under these conditions.

Figure 4:
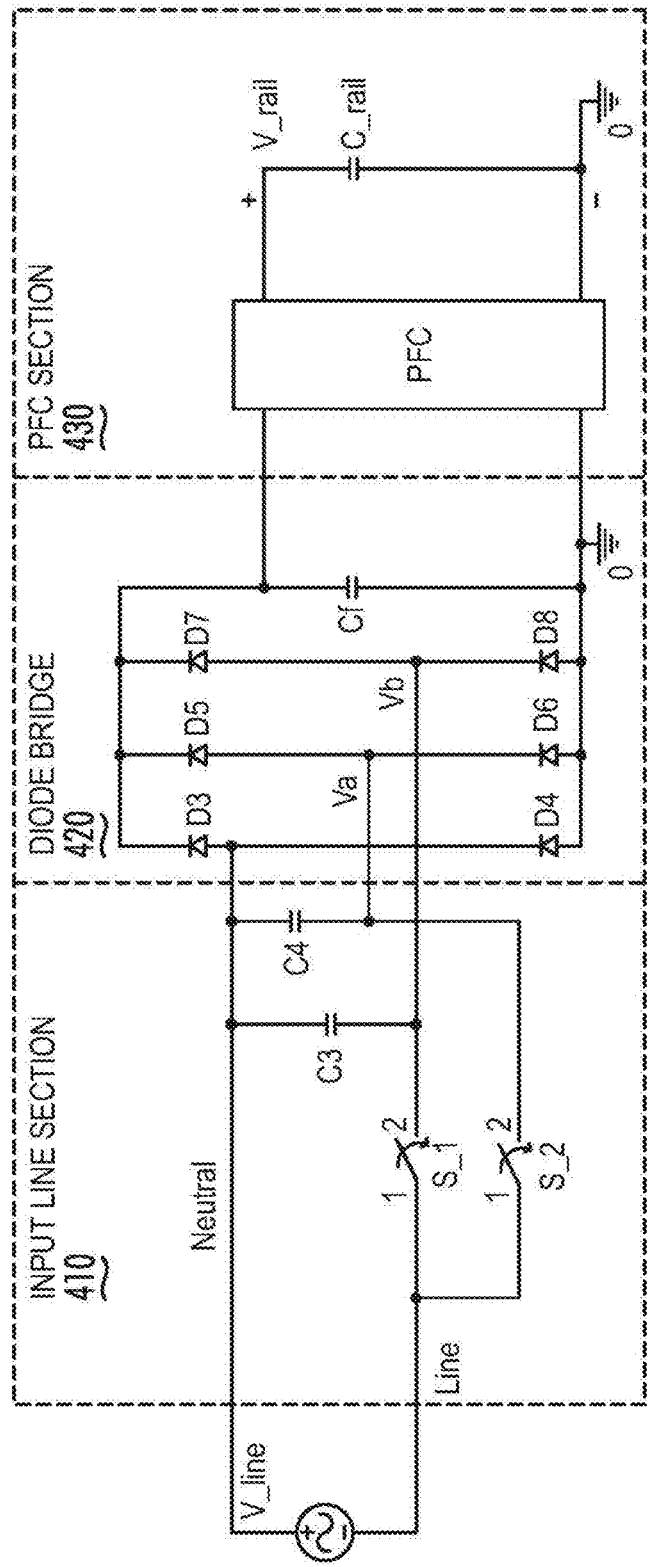
FIG. 4 illustrates an input stage of a power supply according to a conventional arrangement.

FIG. 4 illustrates an input stage of a power supply 400 according to a typical arrangement. The power supply 400 includes an input line section 410, a diode bridge 420, and a power factor correction section 430. The input line section 410 may include or may be coupled to an alternating current (AC) line voltage source V_line connected to input lines line1, line2, and a neutral line. In the embodiment illustrated by FIG. 4, the AC line voltage source V_line is external to the input line section 410, and may be configured to couple or otherwise contact one or more terminals of the input line section to provide the AC line voltage V_line. Line1 is coupled to a switch S_1 and Line2 is coupled to a switch S_2. An unswitched terminal of switch S_1 is coupled to the AC line voltage source V_line. A switched terminal of switch S_1 is coupled first line capacitor C3 and the diode bridge 420. The half-wave rectified signal $V_b$ is provided to the diode bridge 420 by at least one of the switch S_1 and the first line capacitor C3. An unswitched terminal of switch S_2 is coupled to the AC line voltage source V_line. A switched terminal of switch S_2 is coupled to the second line capacitor C4 and to the diode bridge 420. The half-wave rectified signal $V_a$ is provided to the diode bridge 420 by at least one of the switch S_2 and the second line capacitor C4. The neutral line is coupled to Line1 via the first line capacitor C3, is coupled to Line2 via the second line capacitor C4, and is coupled to the diode bridge 420.

The diode bridge 420 includes input rectifying diodes D3-D8. A neutral line signal from the neutral line is received as an input to the diode bridge 420 between the diodes D3 and D4. The diodes D3 and D4 are configured to rectify the neutral line signal received at the diode bridge 420 from the input line section 410. A first line signal from Line1 is received as input to the diode bridge 420 between the diodes D7 and D8, and represents the half-wave rectified signal $V_b$. A second line signal from the Line2 is received as input to the diode bridge 420 between the diodes D5 and D6, and represents the half-wave rectified signal $V_a$.

Output from the diode bridge 420 is connected across a filter capacitor Cf and to a power factor correction circuit 435. The filter capacitor Cf provides high frequency filtering and mitigates electromagnetic interference. The power factor correction circuit 435 provides power factor correction to the filtered output of the diode bridge 420 and outputs a rail voltage V_rail. The rail voltage V_rail of the power correction circuit 435 is connected across a rail capacitor C_rail. The rail capacitor is connected to ground at its negative side in one exemplary embodiment.

Figure 5:
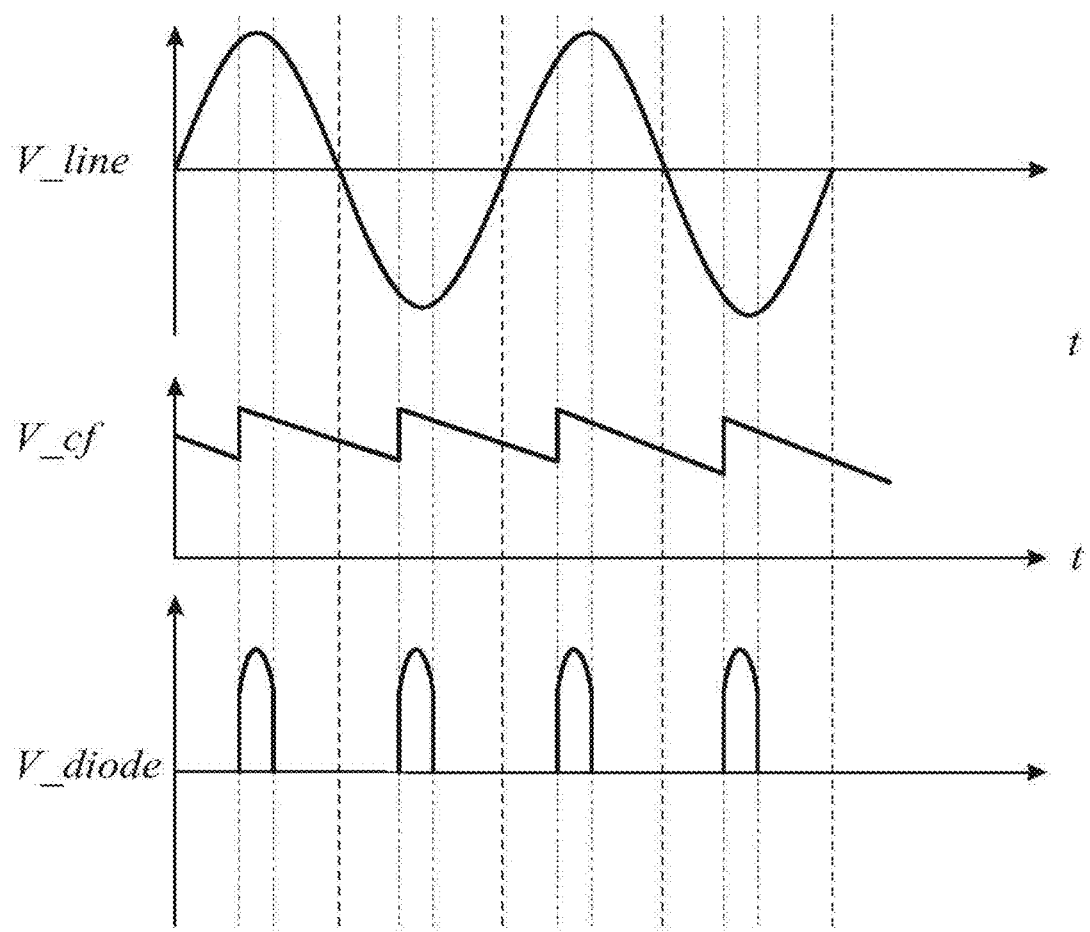
FIG. 5 illustrates a timing diagram for an input stage of a power supply according to FIG. 4 when a light load is coupled to the voltage rail.

FIG. 5 illustrates a timing diagram for an input stage of a power supply according to FIG. 4 when a light load is coupled to the voltage rail according to an exemplary embodiment. As illustrated by FIG. 5, when the load connected to the rail is very light, the voltage across the filtering capacitor Cf is not a rectified full wave output. Instead, it may take the form of a saw-tooth waveform. The filtering capacitor Cf may then be charged up only around the peak of the line voltage, and as a result discharges most of the time due to the light load. The conduction angle of each input rectifying diode D3-D8 may only be limited around peaks of the line voltage, as shown in FIG. 5. As such, the voltage across each input diode might not be a sinusoidal waveform. Instead, it might be a pulse waveform. The pulse width of the pulse waveform depends on a size of the load. For example, the heavier the load, the wider the pulse width.

The waveform of the voltage Vc changes when the load is very light. Because the waveform of voltage Vc changes excessively when there is a light load, averaging the sensed voltage Vc will not work (e.g., as in a heavy load condition), and step dimming control will not function correctly.

In the context of LED lighting, a load condition for an LED driver can have very wide range. For example, a 55 w LED driver can have a load range from 55V LEDs at 1 A, 55 Watt, to 12V LEDs, 10 mA, 1.2 Watt. The worst-case-scenario for an LED driver is a no load condition. A well-designed step dimming interface must be designed to correctly function in a plurality of load conditions.

Figure 6A:
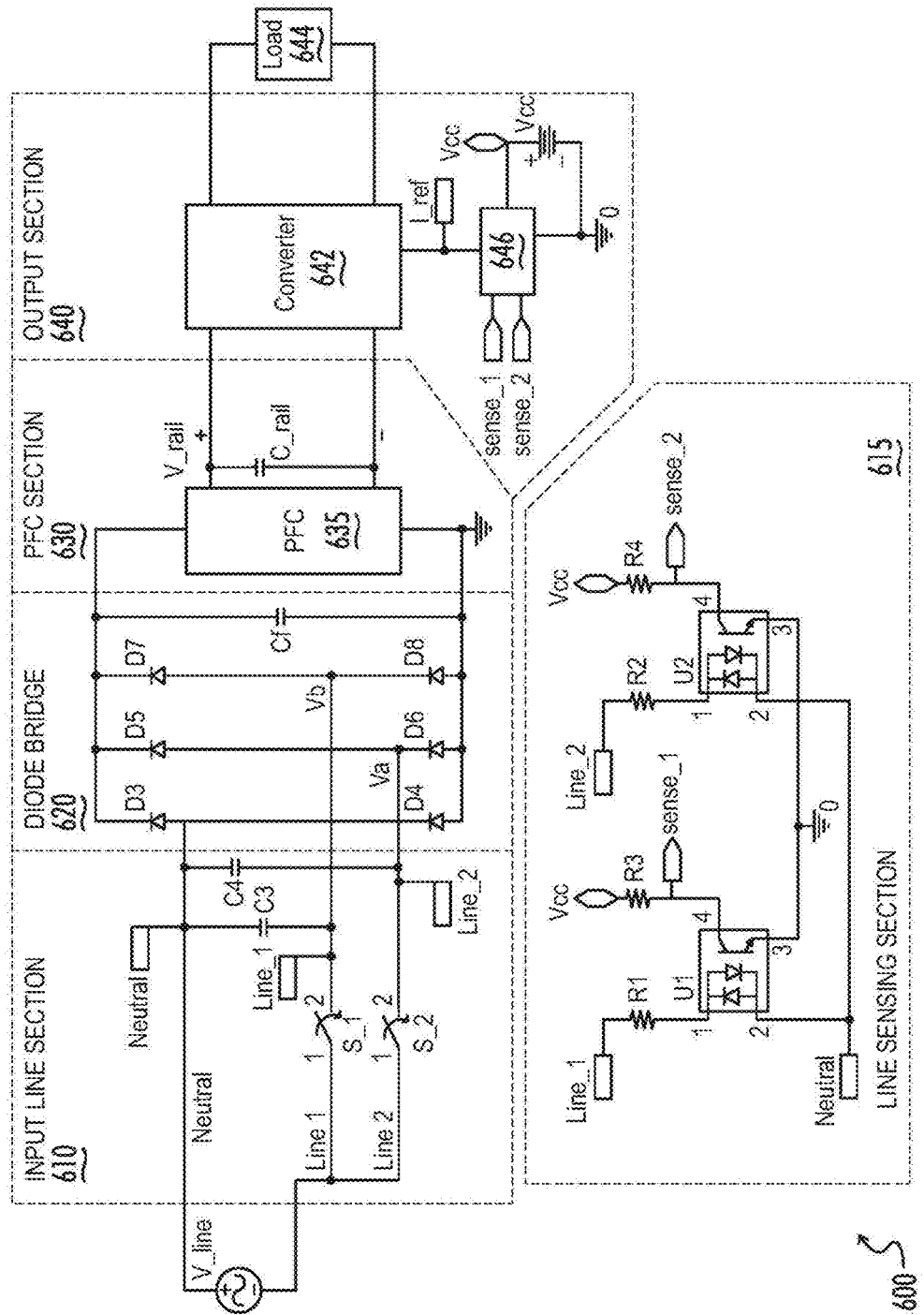
FIGS. 6A and 6B respectively illustrate a step dimming control circuit and a line sensing section of a step dimming control circuit according to exemplary embodiments of the present invention.
Figure 6B:
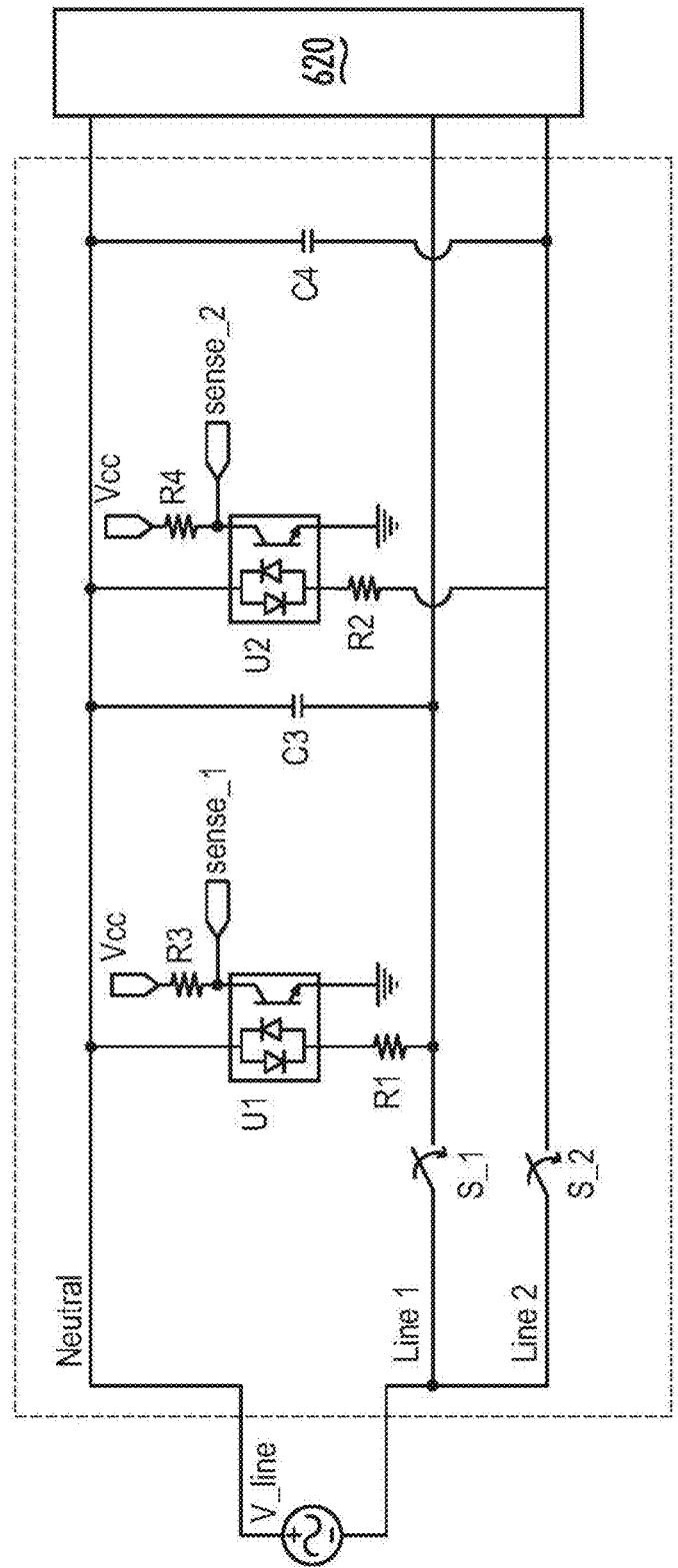

FIGS. 6A and 6B respectively illustrate a step dimming control circuit and a line sensing section of a step dimming control circuit according to exemplary embodiments of the present invention. The step dimming control circuit 600 of FIG. 6A is configured to provide a step dimming control interface operable with a plurality of loads each having an associated load condition.

The step dimming control circuit 600 includes one or more of an input line section 610, a diode bridge 620, a power factor correction circuit 630, and an output section 640. The input line section 610 includes terminals that couple an alternating current (AC) line voltage source V_line to input lines Line1, Line2, and Neutral. In the embodiment illustrated by FIG. 6, the AC line voltage source V_line is external to the input line section 610, and may be configured to couple or otherwise contact one or more terminals of the input line section to provide the AC line voltage V_line. Although illustrated in FIG. 6 as having two connection terminals and/or lines, it should be appreciated at that the AC line voltage source V_line may be coupled to or otherwise placed in contact with the input line section 610 by any number of lines and/or terminals. First input Line1 is coupled to a first line switch S_1 and second input Line2 is coupled to a second line switch S_2. The first line switch S_1 is coupled at one side to the AC line voltage source V_line and at the other side to the first line capacitor C3 and the diode bridge 620 in one exemplary embodiment. A half-wave rectified signal $V_b$ is provided to the diode bridge 620 by at least one of the first line switch S_1 and the first line capacitor C3. The second line switch S_2 is coupled at one side to the AC line voltage source V_line and at the other side to the second line capacitor C4 and to the diode bridge 620. A half-wave rectified signal $V_a$ is provided to the diode bridge 620 by at least one of the second line switch S_2 and the second line capacitor C4. The Neutral line is coupled to first input Line1 via the first line capacitor C3, is coupled to second input Line2 via the second line capacitor C4, and is coupled to the diode bridge 620.

The input line section 610 may include one or more components of a line sensing section 615 (FIG. 6B) in various embodiments. In one exemplary embodiment, each component of the line sensing section 615 is included within the input line section 610. In another embodiment, at least one component of the line sensing section 615 is connected between the Neutral line and at least one of first input Line1 and second input Line2. The line sensing section 615 may be configured to detect a line input status of at least one of first input Line1 and second input Line2.

The line sensing section 615 may receive a Line_1 input signal at an output of the first line switch S_1 during operation. A first line resistor R1 may be placed in series with an optocoupler U1. In one exemplary embodiment, the optocoupler U1 is a bi-directional optocoupler configured to rectify the Line_1 input signal. The rectified output of the optocoupler U1 is connected to the Neutral line in one embodiment. The line sensing section 615 may receive a Vcc signal in series with a first sense resistor R3 at a phototransistor input side of the optocoupler U1 corresponding to the Line_1 input signal. The optocoupler U1 may include at least two diodes (e.g., LEDs) therein configured to rectify the Line_1 input signal at an LED source side of the optocoupler U1. A status corresponding to the Line_1 input signal may be sensed via signal sense_1. In one exemplary embodiment, the status corresponds to a zero-crossing point of the Line_1 input signal. The first sense signal corresponding to the sense_1 input of microcontroller 646s is sensed between the first sense resistor R3 and the optocoupler U1. An output of the optocoupler U1 from the phototransistor side of the optocoupler U1 may be provided to ground.

The line sensing section 615 may be configured to receive a Line_2 input signal at an output of the second line switch S_2 during operation. A second line resistor R2 may be placed in series with an optocoupler U2. In one exemplary embodiment, the optocoupler U2 is a bi-directional optocoupler configured to rectify the Line_2 input signal. The rectified output of the optocoupler U2 is connected to the Neutral line in one embodiment. The line sensing section 615 may be configured to receive the Vcc signal in series with a second sense resistor R4 at a phototransistor input side of the optocoupler U2 corresponding to the Line_2 input signal. The optocoupler U2 may include at least two diodes (e.g., LEDs) therein configured to rectify the Line_2 input signal at an LED source side of the optocoupler U2. A status corresponding to the Line_2 input signal may be sensed via signal sense_2. In one exemplary embodiment, the status corresponds to a zero-crossing point of the Line_2 input signal. A second sense signal corresponding to the sense_2 input may be sensed between the second sense resistor R4 and the optocoupler U2. Output from the optocoupler U2 at the phototransistor side of the optocoupler U2 may be provided to ground.

The line sensing section 615 may include one or more isolation circuits. For example, in one embodiment, at least one of the first line resistor R1, optocoupler U1, and first sense resistor R3 may be referred to as a first isolation circuit (either alone or in combination), while at least one of the second line resistor R2, the optocoupler U2, and the second sense resistor R4 may be referred to as a second isolation circuit (either alone or in combination).

One or more of the Line_1, Line_2, and Neutral signals may be provided to the diode bridge 620. The diode bridge 620 may include input rectifying diodes D3-D8. The Neutral line signal from the Neutral line is received as input to the diode bridge 620, for example between diodes D3 and D4. The diodes D3 and D4 are configured to rectify the Neutral line signal received at the diode bridge 620 from the input line section 610. A first line signal Line_1 is received as input to the diode bridge 620 between the input diodes D7 and D8, and may be represented by the half-wave rectified signal $V_b$. A second line signal from Line_2 is received as input to the diode bridge 620 between the input diodes D5 and D6, and may be represented by the half-wave rectified signal $V_a$.

Output from the diode bridge 620 is connected across a filter capacitor Cf to a power factor correction (PFC) circuit 635. The filter capacitor Cf provides high frequency filtering and mitigates electromagnetic interference. The PFC circuit 635 provides power factor correction to the filtered output of the diode bridge 620 and may be configured to output a rail voltage V_rail.

The rail voltage V_rail, is output from the PFC circuit 635 and connected to the converter 642 across the rail capacitor C_rail. The output section 640 includes at least one of a converter 642 and a microcontroller 646. A load 644 may be included within or external to the output section 640. For example, the exemplary embodiment illustrated by FIG. 6 provides the load 644 external to the output section 640. In one or more embodiments, the output section 640 may include one or more terminals configured to couple to or otherwise contact at least one terminal or connector associated with the load 644. Although illustrated with two lines and/or terminals coupling the converter 642 and load 644, it should be appreciated that the converter 642 and load 644 may be configured to couple to or otherwise be placed in contact with one another using any number of lines and/or terminals. The converter 642 is coupled to the voltage rail V_rail. The microcontroller 646 provides a reference current I_ref to the converter 642. The converter 642 may provide an output according to the reference current I_ref received from the microcontroller 646. For example, the converter 642 may use the received reference current I_ref to provide a constant line current and/or voltage to the load 644, even when operating according to one or more different load conditions. In one exemplary embodiment, the converter 642 is a DC-DC converter configured to receive the voltage V_rail and to provide output to the load 644 according to the reference current I_ref received from the microprocessor 646. The converter 642 may be configured to be coupled to the microcontroller 646 and to one or more LED load terminals. The converter may be configured to receive one or more reference currents I_ref from the microcontroller 646 and to provide a corresponding power output to the one or more LED load terminals.

The microcontroller 646 may be powered by a voltage source Vcc. The microcontroller 646 may receive at least one of sensed signal values sense_1 and sense_2. The value(s) of one or more of sensed signal values sense_1 and sense_2 may be used by the microprocessor 646 to determine the reference current I_ref to be provided to the converter 642. The microcontroller 646 and the voltage source Vcc may be connected to ground.

FIG. 6B illustrates a partial circuit schematic for an input line section 610 including the line sensing section 615 according to an exemplary embodiment. The input line section 610 may include one or more components of the line sensing section 615 in various embodiments. FIG. 6B illustrates an embodiment where each of the components of the line sensing section 615 are included within the input line section 610 and operate according to the description provided with reference to FIG. 6A.

In one or more embodiments illustrated by FIGS. 6A-B, an input line voltage may be sensed directly instead of sensing a voltage across the input diodes D3-D8. As described above, the resistor R1 and the optocoupler U1 may be connected in series between Line1 and Neutral. The resistor R2 and optocoupler U2 may be connected in series between Line2 and Neutral.

Figure 7A:
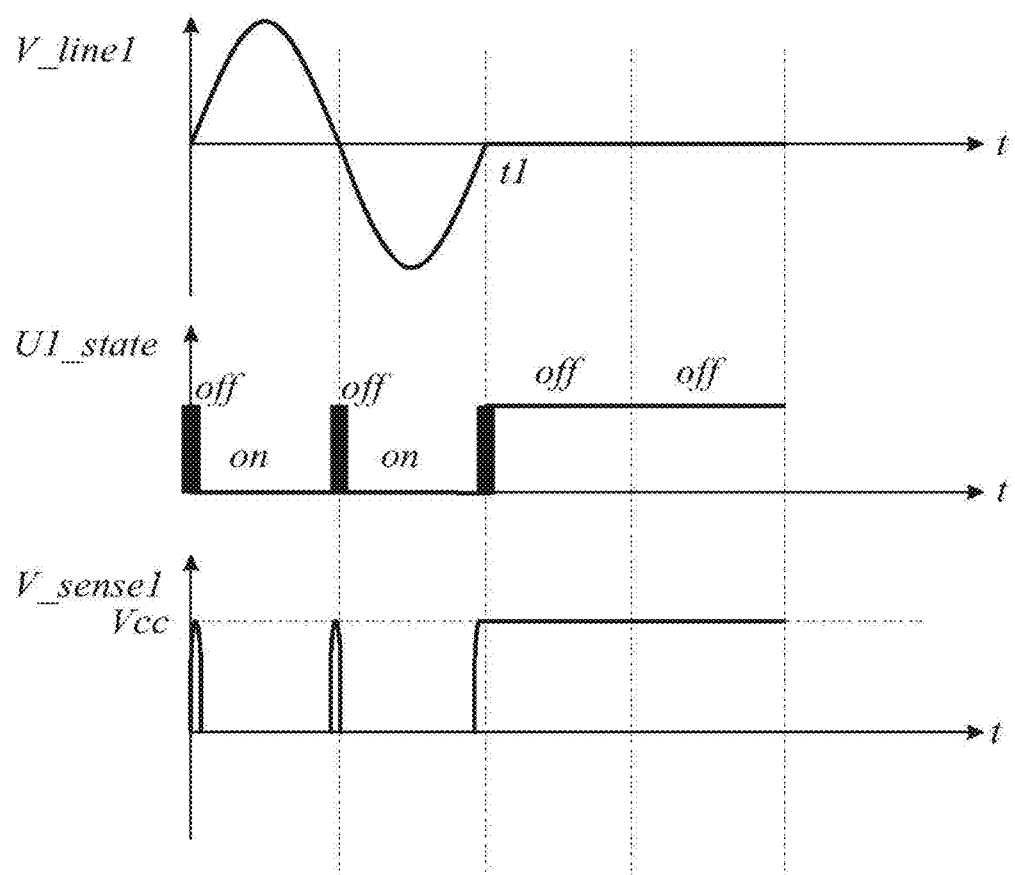
FIGS. 7A-B respectively illustrate a sensing voltage waveform of a step dimming control interface according to exemplary embodiments of the present invention.
Figure 7B:
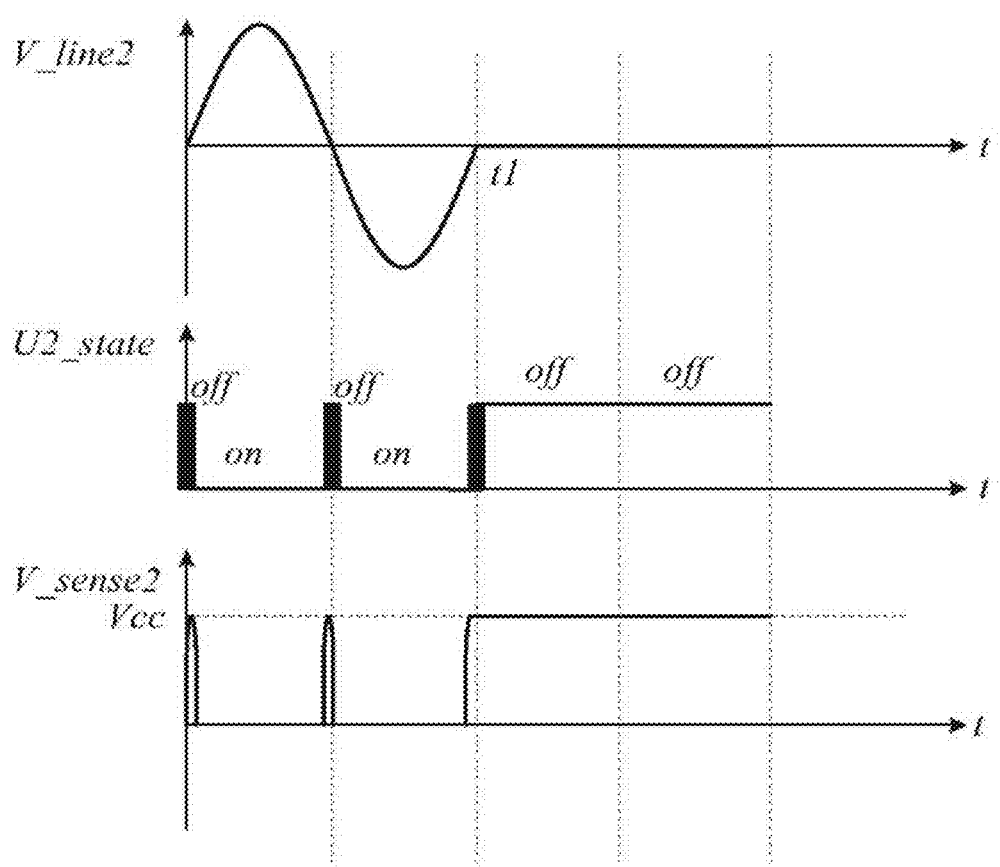

FIGS. 7A-B respectively illustrate a sensing voltage waveform of a step dimming control interface according to exemplary embodiments. In the embodiment reflected in FIG. 7A, when the first line switch S_1 is closed (e.g., Line1 is connected to the driver) the voltage between Line1 and Neutral may be normal. As a result, current flows through a sensing diode associated with the optocoupler U1 and the resistor R1 for most of the line cycle. When a sensing diode of the optocoupler U1 is on, a secondary emitter of the optocoupler U1 is also on such that a voltage of the first sense signal V_sense1 is 0. During the short period of zero crossover, the optocoupler U1 is off (as illustrated by U1_state in FIG. 7A), and as a result, V_sense1 is equal to Vcc during zero crossover in one exemplary embodiment.

When the first line switch S_1 is open at time t1 (or Line_1 is disconnected from the driver), the voltage between Line_1 and Neutral (V_line1) is 0. Thus, no current flows through a sensing diode of the optocoupler U1 and the resistor R1. As a result, the optocoupler U1 is in an off state, and V_sense1 is equal to Vcc during zero crossover in one exemplary embodiment.

The same operating principle applies to the sensing circuit across Line_2 and Neutral. In the embodiment reflected in FIG. 7B, when the second line switch S_2 is closed (e.g., Line2 is connected to the driver) the voltage between Line2 and Neutral may be normal. As a result, current flows through a sensing diode associated with the optocoupler U2 and the resistor R2 for most of the line cycle. When a sensing diode of the optocoupler U2 is on, a secondary emitter of the optocoupler U2 is also on such that a voltage of the second sense signal V_sense2 is 0. During the short period of zero crossover, the optocoupler U2 is off (as illustrated by U2_state in FIG. 7B), and as a result, V_sense2 is equal to Vcc during zero crossover in one exemplary embodiment.

When the second line switch S_2 is open at time t1 (or Line2 is disconnected from the driver), the voltage between Line2 and Neutral (i.e., V_line2 as illustrated by FIG. 7B) is 0. Thus, no current flows through a sensing diode of the optocoupler U2 and the resistor R2. As a result, the optocoupler U2 is in an off state, and V_sense2 is equal to Vcc during zero crossover in one exemplary embodiment.

Line sensing signals sense_1 and sense_2 may be fed back to micro-controller 646. Microcontroller 646 averages at least one of the signals received at the sense_1 and sense_2 inputs first and then to compares the averaged signal to an internal reference (e.g., by means of a table or other reference data). In one exemplary embodiment, the microcontroller 646 may determine that Line1, Line2, or a combination thereof is connected via at least one of switches S_1 and/or S_2 when the averaged sensing signal is less than the internal reference.

If the average sensing signal is greater than the internal reference, the microcontroller 646 determines that at least one of Line1, Line2, or a combination thereof is disconnected. If both lines Line1 and Line2 are connected, the microcontroller 646 sends a full current reference signal, I_ref, to the converter 642. If only Line1 is connected, the microcontroller 646 sends an A % current reference signal, I_ref*A %, to the converter 642. If only Line2 is connected, the microcontroller 646 sends a B % current reference signal, I_ref*B %, to the converter 642. Accordingly, in various embodiments consistent herewith, the line voltage may be configured not to change and the performance of the step dimming interface may thus be consistent regardless of the load condition.

Figure 8:
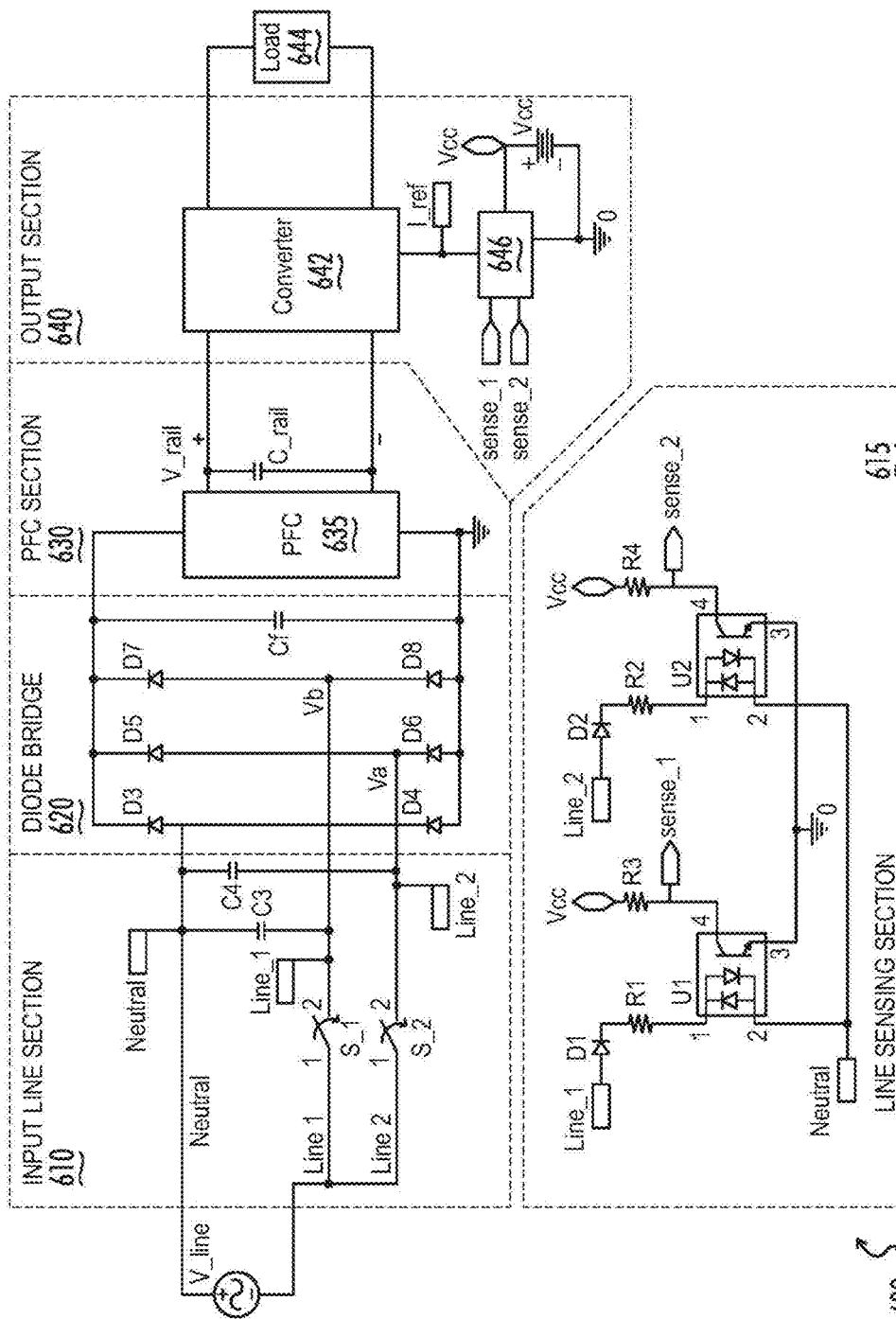
FIG. 8 illustrates a step dimming control interface according to an exemplary embodiment of the present invention.

FIG. 8 illustrates a step dimming control interface 800 according to an exemplary embodiment. The step dimming interface 800 provides a system as illustrated and described with reference to FIGS. 6A-B and further includes a first diode D1 connected in series between the first line switch S_1 and the resistor R1. The step dimming interface 800 further includes a second diode D2 connected in series between the second line switch S_2 and the resistor R2. The step dimming control interface 800 implements decreased power dissipation across the resistors R1 and R2. The diodes D1 and D2 block a half cycle of the line voltage for the resistors R1 and R2 so that power dissipation is reduced by half compared to the circuit illustrated by FIG. 6.

Figure 9:
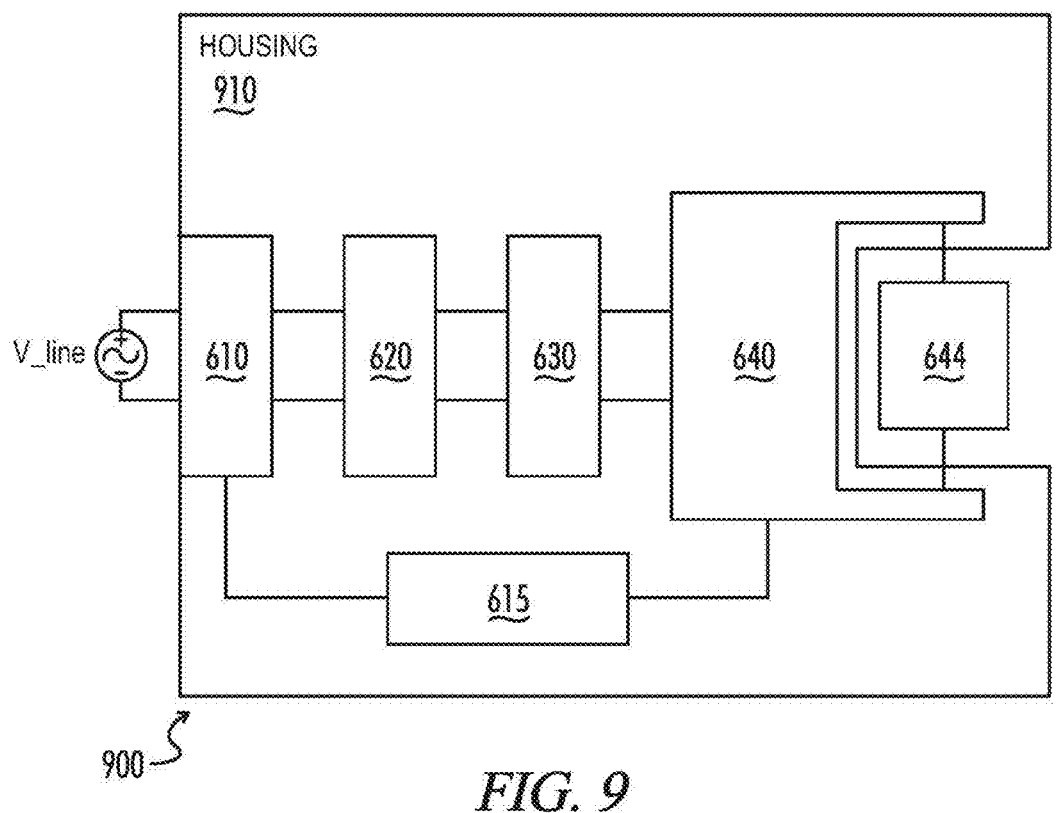
FIG. 9 illustrates a lighting fixture configured to provide a direct input line sensing step dimming interface for controlling an LED load according to an exemplary embodiment of the present invention.

FIG. 9 illustrates a lighting fixture configured to provide a direct input line sensing step dimming interface for controlling an LED load according to an exemplary embodiment. The lighting fixture 900 includes a housing 910 and one or more previously-described components of the step dimming control circuit 600 of FIGS. 6A-B. For example, the lighting fixture 900 may include one or more of the input line section 610, the line sensing section 615, the diode bridge 620, the power factor correction section 630, and/or the output section 640 as described above. One or more of the elements of the step dimming control circuit 600 may be located either entirely or in part within the housing 910. The load 644 may be at least one light emitting diode (LED) coupled to the housing in an exemplary embodiment. As described above, a load 644 may be included within or external to the output section 640. In one or more embodiments, the output section 640 may include one or more terminals configured to couple to or otherwise contact at least one terminal or connector associated with the load 644.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A light emitting diode (LED) driver circuit providing a direct input line sensing step dimming interface for controlling an LED load, the LED driver circuit comprising:
   a first input line coupled to an unswitched terminal of a first line switch;
   a second input line coupled to an unswitched terminal of a second line switch;
   a neutral line;
   a diode bridge coupled to respective switched terminals of each of the first line switch and to the second line switch and to the neutral line;
   a first isolation circuit coupled between the first line switch and the diode bridge, and comprising a first line resistor, a first sense resistor, and a first optocoupler having an LED source side and a phototransistor side, wherein the first optocoupler is coupled between the first sense resistor and ground at the phototransistor side, and is coupled between the first line resistor and the neutral line at the LED source side;
   a second isolation circuit coupled between the second line switch and the diode bridge, and comprising a second line resistor, a second sense resistor, and a second optocoupler having an LED source side and a phototransistor side, wherein the second optocoupler is coupled between the second sense resistor and ground at the phototransistor side, and is coupled between the second line resistor and the neutral line at the LED source side; and
   a microcontroller having a first sense input and a second sense input,
   wherein the first isolation circuit is configured to provide a first sense signal to the first sense input and the second isolation circuit is configured to provide a second sense signal to the second sense input, and
   wherein the microcontroller is configured to control an output of the LED driver circuit based at least in part upon at least one of the first sense signal and the second sense signal.

2. The LED driver circuit of claim 1 further comprising a converter coupled to the microcontroller and to one or more LED load terminals, the converter being configured to receive a control current from the microcontroller and to control output from the converter to the one or more LED load terminals at least in part according to the control current.

3. The LED driver circuit of claim 2, further comprising a power factor correction circuit coupled between the diode bridge and the converter.

4. The LED driver circuit of claim 1, wherein:
   the first isolation circuit includes a first diode coupled between the first line switch and the first line resistor; and
   the second isolation circuit includes a second diode coupled between the second line switch and the second line resistor.

5. The LED driver circuit of claim 1, wherein the first sense input of the microcontroller is coupled to the first isolation circuit between the first sense resistor and the first optocoupler, and wherein the second sense input of the microcontroller is coupled to the second isolation circuit between the second sense resistor and the second optocoupler.

6. The LED driver circuit of claim 1, further comprising:
   a first line capacitor coupled between the first line switch and the diode bridge; and
   a second line capacitor coupled between the second line switch and the diode bridge,
   wherein the neutral line is coupled to the first line switch via the first line capacitor and the neutral line is coupled to the second line switch via the second line capacitor.

7. A lighting fixture comprising:
   a housing;
   at least one light emitting diode (LED) coupled to the housing; and
   an LED driver configured to provide a direct input line sensing step dimming interface for controlling output to the at least one LED, the LED driver including,
      a first input line coupled to an unswitched terminal of a first line switch;
      a second input line coupled to an unswitched terminal of a second line switch;
      a neutral line;
      a diode bridge coupled to respective switched terminals of each of the first line switch and to the second line switch and to the neutral line;
      a first isolation circuit coupled between the first line switch and the diode bridge, and comprising a first line resistor, a first sense resistor, and a first optocoupler having an LED source side and a phototransistor side, wherein the first optocoupler is coupled between the first sense resistor and ground at the phototransistor side, and is coupled between the first line resistor and the neutral line at the LED source side;
      a second isolation circuit coupled between the second line switch and the diode bridge, and comprising a second line resistor, a second sense resistor, and a second optocoupler having an LED source side and a phototransistor side, wherein the second optocoupler is coupled between the second sense resistor and ground at the phototransistor side, and is coupled between the second line resistor and the neutral line at the LED source side; and
      a microcontroller having a first sense input and a second sense input,
      wherein the first isolation circuit is configured to provide a first sense signal to the first sense input and the second isolation circuit is configured to provide a second sense signal to the second sense input, and
      wherein the microcontroller is configured to control an output of the LED driver circuit based at least in part upon at least one of the first sense signal and the second sense signal.

8. The lighting fixture of claim 7, wherein the LED driver further includes a converter coupled to the microcontroller and to the at least one LED, the converter being configured to receive a control current from the microcontroller and to control output from the converter to the at least one LED at least in part according to the control current.

9. The lighting fixture of claim 8, the LED driver further includes a power factor correction circuit coupled between the diode bridge and the converter.

10. The lighting fixture of claim 7, wherein:
the first isolation circuit includes a first diode coupled between the first line switch and the first line resistor; and
the second isolation circuit includes a second diode coupled between the second line switch and the second line resistor.

11. The lighting fixture of claim 7, wherein the first sense input of the microcontroller is coupled to the first isolation circuit between the first sense resistor and the first optocoupler, and wherein the second sense input of the microcontroller is coupled to the second isolation circuit between the second sense resistor and the second optocoupler.

12. The lighting fixture of claim 7, wherein the LED driver circuit further includes:
a first line capacitor coupled between the first line switch and the diode bridge; and
a second line capacitor coupled between the second line switch and the diode bridge,
wherein the neutral line is coupled to the first line switch via the first line capacitor and the neutral line is coupled to the second line switch via the second line capacitor.

\* \* \* \* \*